United States Patent [19]

Nash

[11] 4,294,476
[45] Oct. 13, 1981

[54] CONNECTING DEVICE

[76] Inventor: Patrick L. Nash, 7 E. Mill St., Shelburn, Ind. 47879

[21] Appl. No.: 92,929

[22] Filed: Nov. 8, 1979

[51] Int. Cl.³ .............................................. F16L 41/00
[52] U.S. Cl. .................................... 285/189; 285/424
[58] Field of Search ................. 285/424, 189, 158, 222

[56] References Cited

U.S. PATENT DOCUMENTS

| 2,963,783 | 12/1960 | Field | 285/424 X |
| 3,185,506 | 5/1965 | Szlashta | 285/158 X |
| 3,754,782 | 8/1973 | De Lord | 285/424 |
| 3,836,181 | 9/1974 | Kelver | 285/424 X |
| 4,009,894 | 3/1977 | Marquette et al. | 285/424 X |
| 4,046,409 | 9/1977 | Virgin | 285/424 X |

FOREIGN PATENT DOCUMENTS 2434160  1/1976  Fed. Rep. of Germany ...... 285/424

Primary Examiner—Thomas F. Callaghan
Attorney, Agent, or Firm—Harvey B. Jacobson

[57] ABSTRACT

A device is disclosed relating to sheet metal duct connections, particularly where sections of metal ducts must be joined during construction of metal duct work. A connecting device cuttable to any desired length without substantial waste can be inserted on a segment of duct and joined to a wall or second duct surface having an opening cut to the size of the first duct to which is attached the connecting device. By manual manipulation, the connecting device can then anchor the first duct to the wall or second duct opening.

13 Claims, 8 Drawing Figures

CONNECTING DEVICE

BACKGROUND OF THE INVENTION

1. Field of the Invention

The invention relates to the field of air conditioning, heating, ventilating, and similar systems in which sheet metal duct work is used for conveying an air supply within buildings, residences, and the like. Particularly, the invention provides a connecting device for joining a section of sheet metal duct work to a wall or second duct having an opening to receive the first duct segment.

2. Disclosure Statement

In U.S. Pat. No. 2,963,783, issued Dec. 13, 1960, to J. P. Field, sheet metal fittings are disclosed in which a roll of deformable tabs forms a skirt which projects into an opening of a wall, with the tabs adapted for bending into clamping engagement with the marginal portion of wall surrounding the opening. However, the tabs appear to be integral with the duct work fitting, and are not in the form of a strip for connecting a standard fitting to a hole cut to a desired size. Various connecting devices are disclosed in U.S. Pat. No. 3,988,030, issued Oct. 26, 1976, to J. L. Twedell; U.S. Pat. No. 1,935,690, issued Nov. 21, 1933, to H. J. Zack; and U.S. Pat. No. 4,009,894, issued Mar. 1, 1977, to R. L. Marquette, et al. In U.S. Pat. No. 3,727,663, issued Apr. 17, 1973, to F. J. McCabe, a device is disclosed having adapter means for mounting a fire damper in a wall.

SUMMARY OF THE INVENTION

All of the previously known coupling devices suffer from the problems of lack of either economical construction, versatility of use, or difficulty in application. The present invention provides an economically constructable, versatile, easily used connecting device for joining sheet metal ducts in building construction without wasting substantial quantities of material. The connecting device of the invention provides a folded strip of metal insertable over the projecting end of a sheet metal duct segment, along with a folded flange surface having tabs which project outwardly from the sheet metal segment. The tabs are inserted into the opening to be joined to the sheet metal segment, and the user of the device folds the tabs outwardly to anchor the segment between the flange and folded tabs.

Accordingly, an object of the present invention is to provide a connecting device for anchoring a sheet metal segment to a wall having an opening substantially the same size as the sheet metal segment.

Another object is to provide a device which can be economically manufactured, and is marketable in standard lengths of strip which can be cut to the exact length desired.

Still another object is to provide a connecting device for sheet metal duct work which anchors a sheet metal segment to a wall opening with minimum material waste.

Yet another object is to provide a connecting device fastenable to an opening in a wall or second sheet metal duct by manipulating manually a plurality of tabs projecting into the opening and retaining the sheet metal segment between the folded tabs and a flange surface of the connecting device.

A further object of the invention is to provide a connecting device which can be installed in the field.

Another further object is to reduce the amount of space required for installation of a connecting device in duct work.

Still another further object is to eliminate need for forming cleat edges on the wall or second duct.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
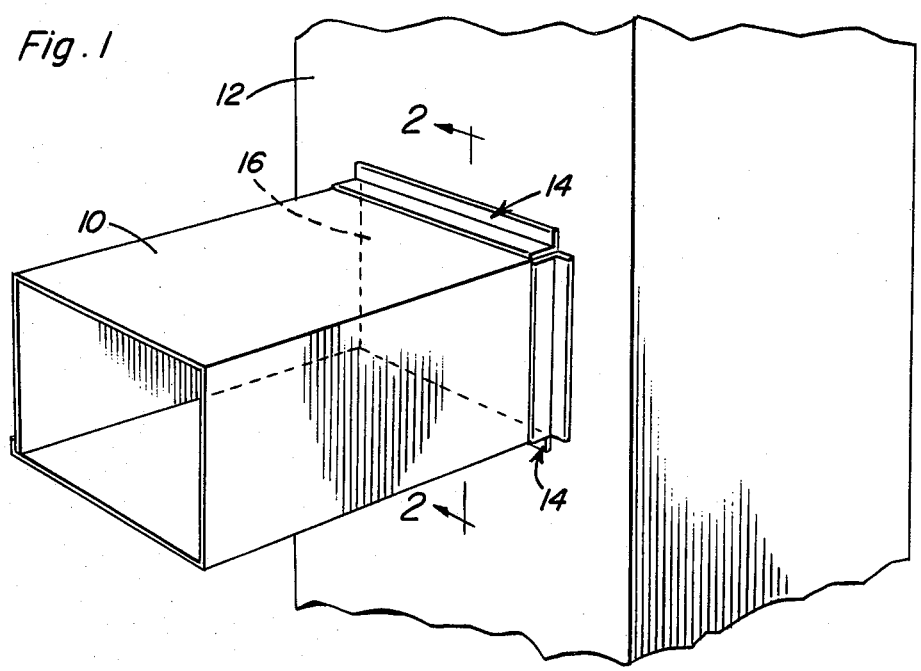
FIG. 1 is a perspective view of a first duct segment connected to a larger second duct by the device of the present invention.
Figure 2:
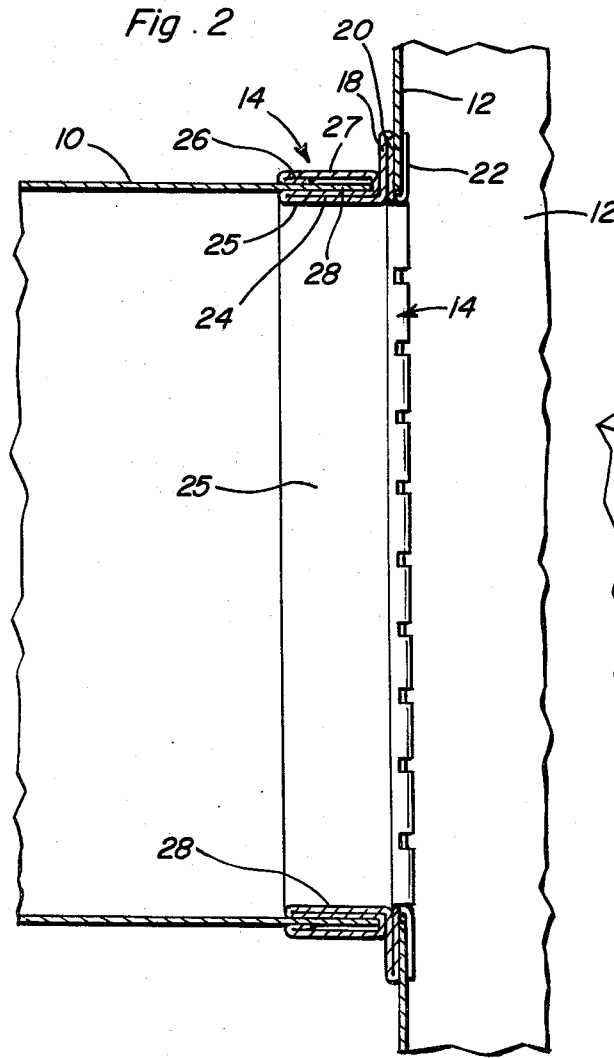
FIG. 2 is a sectional view of a portion of the first and second ducts of FIG. 1, taken substantially upon a plane passing along section line 2—2 of FIG. 1, and showing the connecting device of the invention after anchoring of the two items of duct work.
Figure 3:
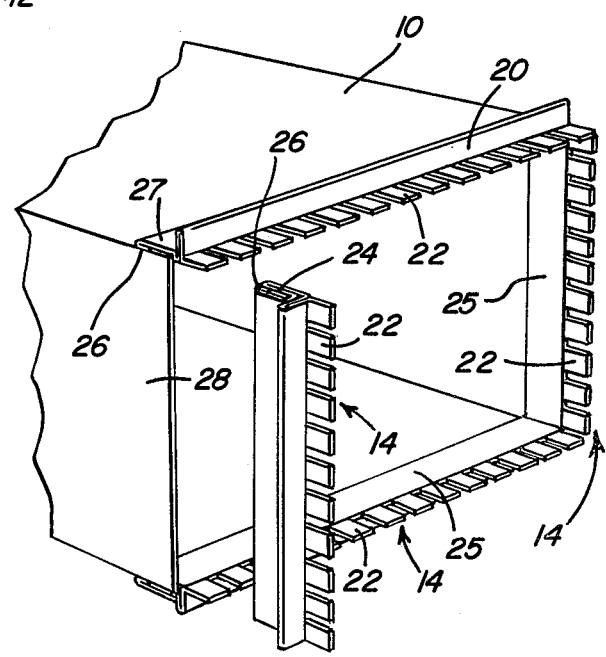
FIG. 3 is a perspective view of a duct segment and associated connecting devices, showing one length of connecting device spaced away from the duct prior to insertion thereon.

In FIG. 1, sheet metal segment 10 is joined to larger second duct 12 by connecting devices 14. Second duct 12 is provided with an opening 16 approximately the same size as the perimeter of first duct 10. The manner of interfitting of connecting device 14 is best seen in FIGS. 2 and 3, where connecting device 14 is seen to be made up of flange segments 18 and 20, tabs 22, edge portions 24 and 26 which draw the outer portion 28 of first duct 10 into clamping retention between surfaces 24 and 26. In operation, edges 24 and 26 are folded in a manner which anchors connecting device 14 to edge strip 28, and provides a substantial sealing action to prevent significant leakage of air from within first duct 10.

Figure 4:
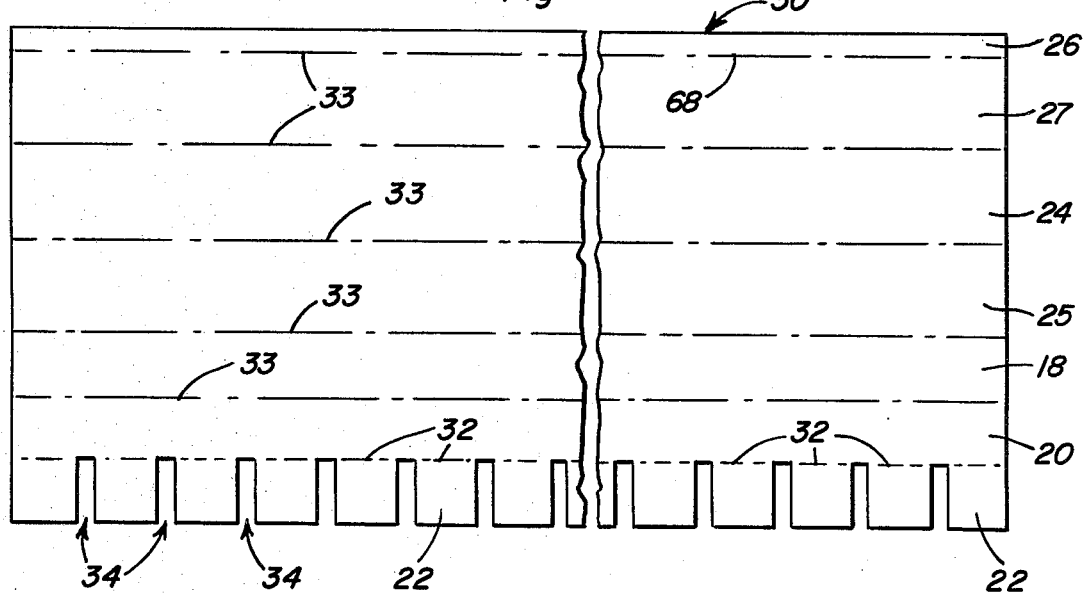
FIG. 4 is a plan view, partially broken away, of a flat section of sheet metal, showing fold lines on which the connecting devices of FIG. 3 have been folded.

FIG. 4 shows the arrangement of crease lines on which a flat sheet metal strip 30 is folded to form connecting device 14. Crease lines 32 are defined between slots 34 cut in sheet 30, and together with fold lines 33, represent the lines on which sheet 30 is bent to form connecting device 14.

Figure 5:
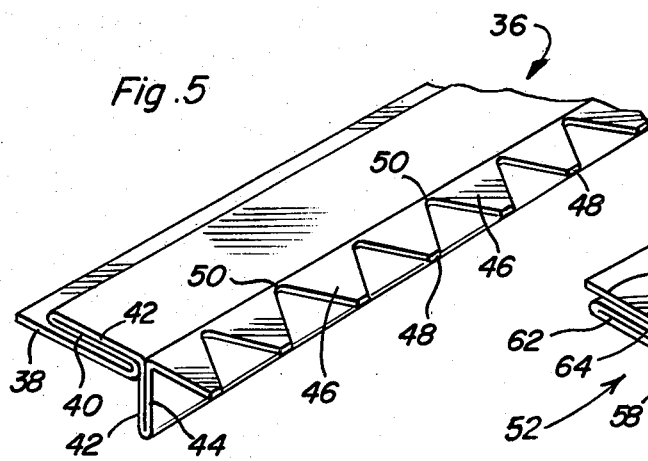
FIG. 5 is a perspective view of a second form of connecting device having serrated rather than notched tabs.
Figure 6:
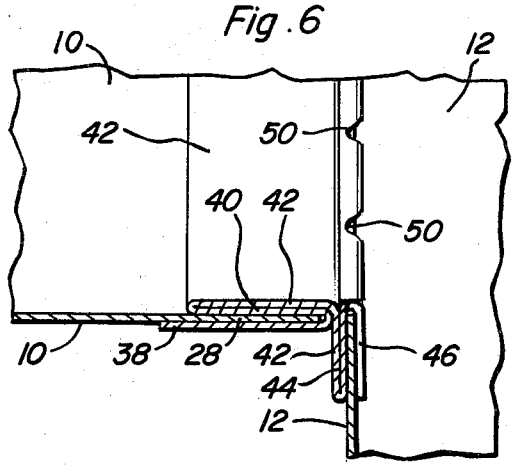
FIG. 6 is a fragmentary sectional view of a joint, such as would be taken upon a plane passing substantially along section line 2—2 on FIG. 1, showing the second form of the invention as shown in FIG. 5, mounted in use.
Figure 8:
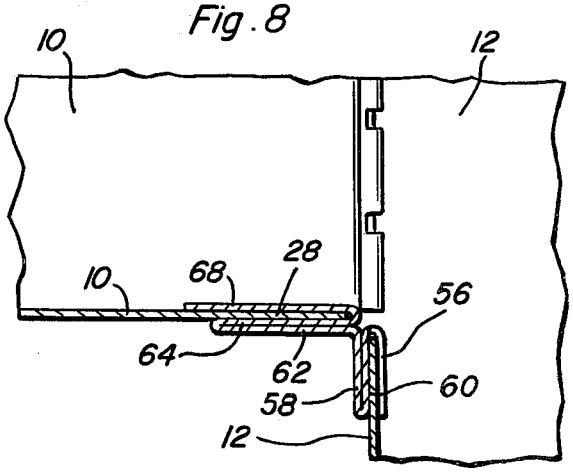
FIG. 8 is a fragmentary sectional view of a joint formed by the third form of the invention, as shown in FIG. 7, such as the joint formed in the manner of FIG. 1.

FIG. 5 shows a second form of the connecting device of the invention, designated by the numeral 36. Edge 28 of first duct 10 can be inserted between strip 38 and strip 40 of device 36, with strips 42 and 44 forming a flange surface, surface 44 contacting the edge of the opening into which first duct 10 is to be anchored. Tabs 46, which are tapered into triangular shapes, but provided with blunt tips 48 for reasons of safety, are bent backwardly toward strip 44 when attaching duct 10 around an opening 16. When assembled, the arrangement will closely resemble that seen in FIG. 1, with FIG. 6 showing an enlarged fragmentary view in section of the assembled device, including strips 42 and 44. The vertex 50 formed between triangular tabs 46 can be seen in FIG. 6 as well as in FIG. 5.

Figure 7:
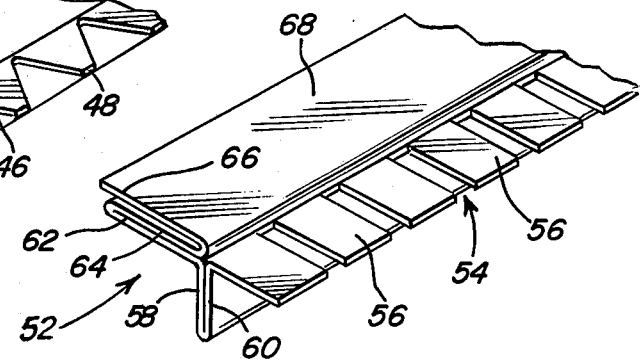
FIG. 7 is a perspective view of a third form of the connecting device of the invention.

In FIG. 7, a third form of the connecting device of the invention is shown, designated by the numeral 52. Connecting device 52 is provided with slots 54 and rectangular tabs 56, as in the first form of the invention, namely, connecting device 14, but fewer edge surfaces are present in the form of FIG. 7, necessitating fewer fold lines and fewer fabricating operations. Flange strips 58 and 60 are comparable to the flange formed from strips 18 and 20 in the device 14 of the first form of the invention, and strips 62 and 64 are analogous to strips 24 and 25 of the first form of connecting device 14, but strip 66 of connecting device 52 is not folded along fold line 68, as in the first form of the invention for connecting device 14. Accordingly, strip 68 differs from strip 27 in not requiring the additional strip 26 to be formed.

To secure connecting device 14, 36 or 52 and to provide additional anchoring security therefor to first duct 10 through the strips in contact with duct 10, or through the flange in contact with second duct 12, it is possible to install sheet metal screws through appropriately drilled holes (not shown) in such strips. Alternatively, pop rivets can be installed through the connecting device flange or strips, and in this way, a flexible canvas connection can be installed as well as a sheet metal duct.

With the present invention, it is only necessary to cut hole 16 to the proper size in duct 12, with no need to form cleat edges on duct 12, or on duct 10. After fastening connecting devices as shown in FIG. 3, it is only necessary to fold over tabs 22 in the direction of flange strip 20 by manually manipulating the tabs, and the assembly is then complete.

With the present invention, certain problems with known flexible connectors are overcome where such known flexible connectors lack sufficient metal on either side to be run through a sheet metal machine. Moreover, many sheet metal shops, particularly smaller firms lack the equipment or machines to fabricate such prior flexible connectors. By providing the present invention in convenient lengths, such as about 5' lengths, the need for individually constructing a flexible connector in a sheet metal shop is obviated. The connecting device of the present invention can be easily cut to the length needed at the job site, generating minimum waste of material. Accordingly, heating, air conditioning, or ventilating system construction is facilitated by the portability of a supply of connecting devices, and by eliminating the need for repeated trips to a fabrication shop or supply house.

For exemplary purposes, the following example presents dimensional data. However, inasmuch as equivalent constructions of differing sizes could be used successfully in a manner known by one skilled in the art, the invention is not intended to be limited to a specific dimensional size or shape, but is intended to be limited only by the scope of the appended claims.

EXAMPLE

A connecting device was constructed according to the form shown in FIG. 7, with the combined thickness of strips 62, 64 and 66 being about $\frac{1}{8}"$ to $\frac{1}{4}"$. Tabs 56 are about $\frac{3}{8}"$ long, the flange formed from strips 58 and 60 is about $\frac{3}{8}"$ long, and strips 62 and 64 are approximately 1" in length, with strip 68 being about $1\frac{1}{4}"$ in length. An additional allowance of about $\frac{1}{8}"$ for the crease is required when determining the size of material to be used as a blank for forming connecting device 52.

Connecting device 52 was constructed by stamping tabs 56 after folding into strips 58, 60, 62, 64 and 66. Frictional engagement of edge portion 28 of duct 10 between strips 62 and 66 was sufficient along the length of connecting device 52 to hold satisfactorily without auxiliary fastening means. The main portion of connecting device 52 lies inside of duct 10, while in the form shown in FIG. 5, the main portion of connecting device 36 falls outside of the duct 10. Under anticipated materials and labor costs, substantial savings can result from use of the connecting device 52. The space occupied by connecting device 52 is about $\frac{1}{8}"$ to $\frac{1}{4}"$, permitting associated utility lines, construction components and the like to occupy the space immediately adjacent duct 10 joined to duct 12.

The connecting device of the present invention offers advantages over known S-cleats, angle cleats, Z-bars and plenum corners, in that the present invention utilizes tabs and the connecting device of the present invention can be used with any raw edge material forming edge strip 28 where such edge material is to be connected to a flat surface.

Of the three forms of the invention, the first form represented by connecting device 14 is preferred in that it takes up less space on the flat surface to be cut out and entered, namely, on duct 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A connecting device for anchoring a duct segment to an opening in a wall, the duct segment having a peripheral edge portion closely receivable into the opening, the connecting device being formable of integral construction from a metal sheet of substantially uniform thickness and comprising a plurality of strips defined by bending said sheet along crease lines, the strips including first and second gripping strips and first and second flange strips, said first and second gripping strips being adapted for grippingly fitting over said peripheral edge portion of the duct, said first and second gripping strips being connected to said first and second flange strips along a joint and being substantially orthogonally aligned to said second flange strip and in parallel alignment with said first flange strip, said first and second flange strips being positioned to abut against said wall in close proximity to the opening, said first flange strip including a plurality of tabs substantially orthogonally aligned to said second flange strip and being manually bendable around said opening to a position parallel to said second flange strip with the portion of the wall immediately adjacent said opening included therebetween, whereby secure anchoring of the duct to the wall around said opening is effected.

2. The connecting device of claim 1 wherein said manually bendable tabs are rectangular and are separated from adjacent tabs by rectangular substantially parallel slots extending inwardly as far as said first flange strip, whereby said tabs are bendable between adjacent slots at a juncture of said tab and said first flange strip to grippingly enclose a portion of said wall adjacent the opening.

3. The connecting device of claim 2 wherein said first and second gripping strips comprise at least three folded substantially parallel aligned strips of said metal sheet, wherein said peripheral edge portion is grippingly engageable between a pair of said at least three folded strips.

4. The connecting device of claim 1 wherein said tabs are triangular in shape, and are formable as a serrated edge of said metal sheet, serrations formed in said edge having a depth extending substantially across said first flange strip.

5. The connecting device of claim 3 wherein at least two of said at least three gripping strips lie inside said duct segment.

6. The connecting device of claim 3 wherein at least two of said at least three gripping strips lie outside said duct segment.

7. The connecting device of claim 1 wherein said metal sheet is substantially rigid steel sheet or plate, and said tabs are formed by one of cutting and stamping of said metal sheet.

8. The connecting device of claim 3 wherein said first and second gripping strips include four strips formed by substantially parallel folds in said metal sheet, said peripheral edge portion being receivable between a pair of said four gripping strips.

9. A connecting device constructed of sheet metal having folds therein and being utilized for connecting a duct to an opening, said device comprising:

gripping means grippingly attachable to a flat planar end portion of said duct so as to establish a connection between said duct and said connecting device, said gripping means including a first gripping strip and a second gripping strip, said frist and second gripping strips being in spaced-apart, planar parallel alignment and having a first pocket formed therebetween into which said flat planar end portion of said duct is grippingly positionable thereby to establish said connection between said duct and said connecting device, at least one of said first and second gripping strips being of a double fold construction wherein two folds of said sheet metal are in a planar parallel abutting relationship to form said at least one of said first and second gripping strips; and flange means attachable to a peripheral edge portion of said opening so as to establish a connection between said opening peripheral edge portion and said connecting device, said flange means being integrally attached to said gripping means and including first and second substantially orthogonally aligned flange strips, said first flange strip being in planar parallel alignment with said first and second gripping strips and being formed as a plurality of manually bendable tabs designed for insertion into said opening, said first flange strip being bendable into spaced-apart, planar parallel alignment with said second flange strip upon positioning of said first flange strip within said opening so as to form a second pocket between said first and second flange strips, said opening peripheral edge portion being positionable within said second pocket thereby to connect said edge portion to said connecting device, said second flange strip being of a double fold construction wherein two folds of said sheet metal are in a planar parallel abutting relationship to form said second flange strip.

10. The connecting device as defined in claim 9, wherein said first gripping strip is provided with a double fold construction, said first gripping strip being positionable against an interior surface of said flat planar end portion of said duct during a connection between said duct and said connecting device.

11. The connecting device as defined in claim 9, wherein said second gripping strip is provided with a double fold construction, said second strip being positionable against an exterior surface of said flat planar end portion of said duct during a connection between said duct and said connecting device.

12. The connecting device as defined in claim 9, wherein said first gripping strip is provided with a double fold construction, said first gripping strip being positionable against an interior surface of said flat planar end portion of said duct during a connection between said duct and said connecting device, and said second gripping strip is provided with a partial double fold construction wherein a first part of said second gripping strip includes two folds of said sheet metal in planar parallel abutting relationship and a second part of said second gripping strip includes only a single layer of said sheet metal.

13. The connecting device as defined in claim 12, wherein said first part of said second gripping strip is in an abutting relationship with an exterior surface of said flat planar end portion of said duct and said second part of said second gripping strip is in a spaced-apart planar parallel relationship with said flat planar end portion of said duct.

* * * * *